US010421382B2

(12) United States Patent
Zheng et al.

(10) Patent No.: US 10,421,382 B2
(45) Date of Patent: Sep. 24, 2019

(54) VEHICLE SEAT ASSEMBLIES

(71) Applicant: Ford Global Technologies LLC, Dearborn, MI (US)

(72) Inventors: Josh Zheng, Nanjing (CN); Qingsong Ma, Nanjing (CN); Bob Wang, Nanjing (CN); Laurence Yin, Nanjing (CN); Sophie Yan, Nanjing (CN)

(73) Assignee: Ford Global Technologies LLC, Dearborn, MI (US)

( * ) Notice: Subject to any disclaimer, the term of this patent is extended or adjusted under 35 U.S.C. 154(b) by 212 days.

(21) Appl. No.: 15/683,640

(22) Filed: Aug. 22, 2017

(65) Prior Publication Data
US 2018/0079334 A1 Mar. 22, 2018

(30) Foreign Application Priority Data

Sep. 20, 2016 (CN) .......................... 2016 1 0835846

(51) Int. Cl.
| | |
|---|---|
| *B60R 22/26* | (2006.01) |
| *B60N 2/90* | (2018.01) |
| *B60N 2/68* | (2006.01) |
| *B60N 2/20* | (2006.01) |
| *B60R 22/02* | (2006.01) |
| *B60R 22/18* | (2006.01) |

(52) U.S. Cl.
CPC ............... *B60N 2/919* (2018.02); *B60N 2/20* (2013.01); *B60N 2/688* (2013.01); *B60R 22/26* (2013.01); *B60N 2002/967* (2018.02); *B60R 2022/021* (2013.01); *B60R 2022/1818* (2013.01); *B60R 2022/266* (2013.01); *Y10T 70/5996* (2015.04)

(58) Field of Classification Search
CPC ........ B60R 2022/021; B60R 2022/266; B60N 2/20; B60N 2/30; B60N 2/3002; B60N 2/3009; B60N 2/3011; B60N 2/3097; B60N 2/919; B60N 2002/952; B60N 2002/967; Y10T 70/5996
USPC ............................................................ 70/261
See application file for complete search history.

(56) References Cited

U.S. PATENT DOCUMENTS

| | | | | |
|---|---|---|---|---|
| 5,741,046 | A * | 4/1998 | Leuchtmann .......... | B60N 2/366 296/65.09 |
| 10,259,350 | B2 * | 4/2019 | Shirai ..................... | B60N 2/90 |
| 2006/0170270 | A1 * | 8/2006 | Inoue .................... | B60N 2/3009 297/378.12 |
| 2014/0312671 | A1 * | 10/2014 | Kawamoto ............. | B60N 2/36 297/354.1 |
| 2015/0336478 | A1 * | 11/2015 | Mitsuhashi .............. | B60N 2/22 296/65.09 |

(Continued)

FOREIGN PATENT DOCUMENTS

| | | | | |
|---|---|---|---|---|
| CN | 102673512 A | | 9/2012 | |
| DE | 19653220 A1 | * | 6/1997 | ............. B60N 2/366 |
| DE | 19904324 A1 | * | 8/2000 | ........... B60N 22/023 |

(Continued)

*Primary Examiner* — Ryan D Kwiecinski
(74) *Attorney, Agent, or Firm* — Vichit Chea; Kolitch Romano LLP

(57) ABSTRACT

A seat for a vehicle is provided. The seat comprises a lock device having an unlocked position and a locked position and an unlock groove disposed on a seat back. The unlock groove is in communication with the lock device and configured to receive a tongue of a seatbelt, and the lock device is unlocked when the tongue is inserted into the unlock groove.

18 Claims, 11 Drawing Sheets

(56) References Cited

U.S. PATENT DOCUMENTS

2015/0336536 A1    11/2015   Stein

FOREIGN PATENT DOCUMENTS

| | | | | |
|---|---|---|---|---|
| DE | 10160293 | A1 | 12/2002 | |
| DE | 102011118013 | A1 | 5/2013 | |
| DE | 102018104598 | A1 * | 9/2018 | ........... B60N 2/2245 |
| EP | 1306274 | A1 | 5/2003 | |
| EP | 1393968 | A2 * | 3/2004 | ......... B60N 2/01583 |
| JP | 3745465 | B2 | 2/2006 | |
| JP | 3745465 | B2 | 2/2006 | |
| JP | 2017087930 | A * | 5/2017 | ............... B60N 2/90 |

\* cited by examiner

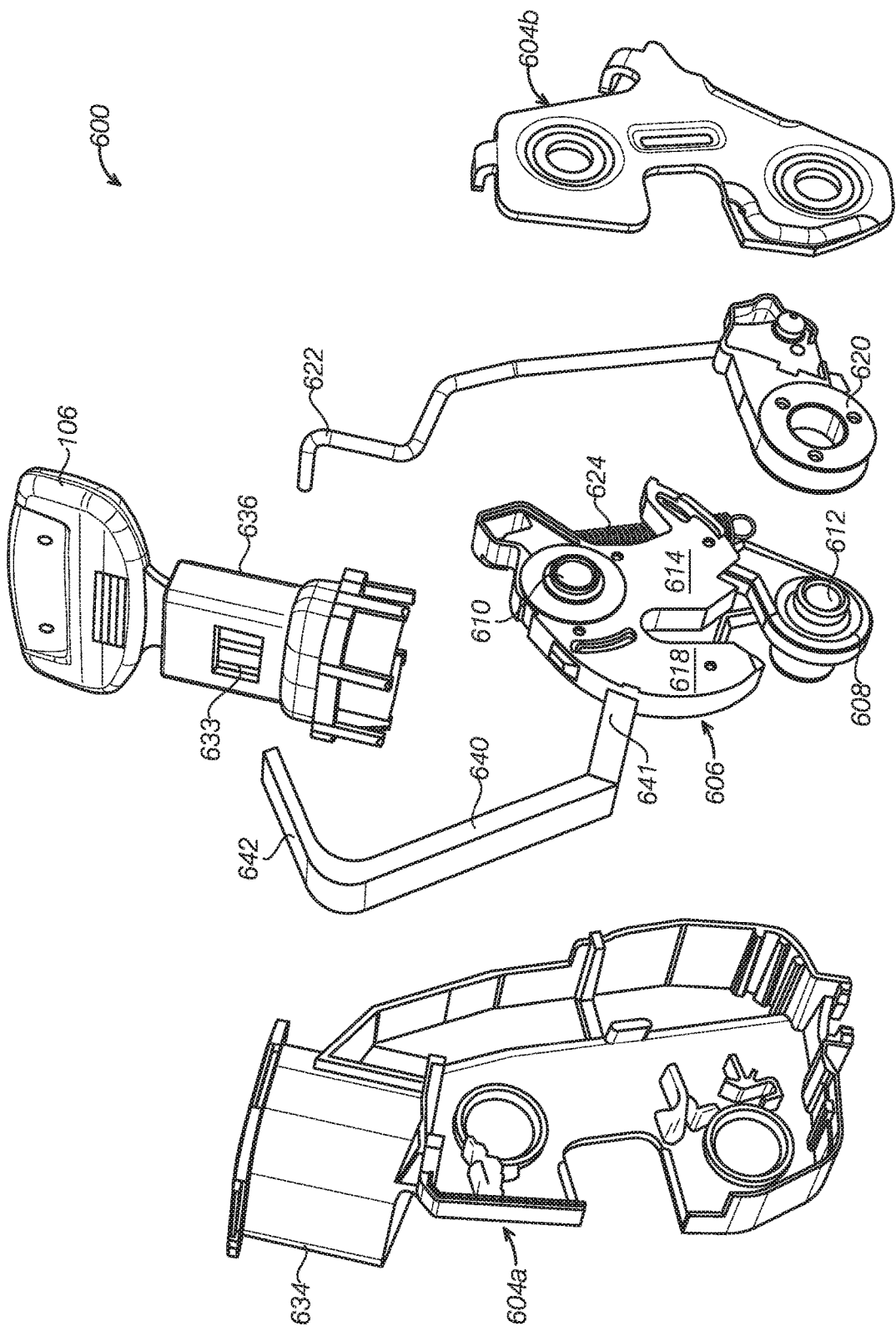

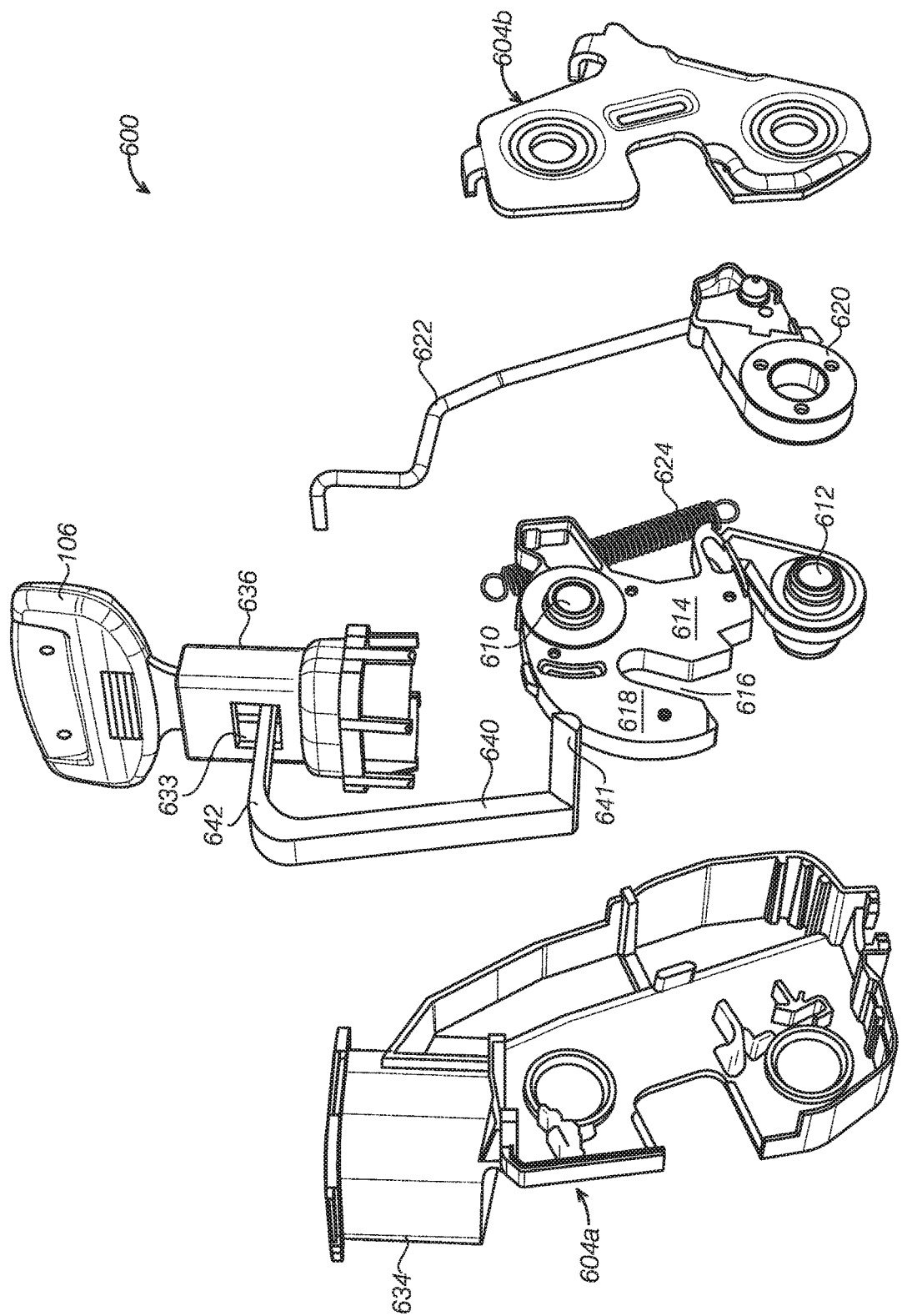

VEHICLE SEAT ASSEMBLIES

RELATED APPLICATION

This application claims the benefit of Chinese Patent Application No.: CN 201610835846.6, filed Sep. 20, 2016, the entire contents thereof being incorporated herein by reference.

FIELD OF THE INVENTION

The present disclosure generally relates to a vehicle seat assembly, in particular related to a lock device of the vehicle seat.

BACKGROUND

Rear seats in some vehicle are foldable towards the front to enlarge the storage space for users. However, when folding the rear seats, the seatbelts may interfere with the seat. Some technologies have been developed to solve the problem. For example, a fixing buckle is provided for the purpose of securing the seatbelt while it's not in use. Japanese Patent JP3745465B2 discloses a guiding structure for a seat belt. The vehicle seat is pivotable between a folded position and a use position while the guiding structure is also pivotable between two positions. When the seat is at the use position, the guiding structure guides the seat belt to a normal use position. During folding of the seat, the guiding structure pivots toward the vehicle side such that the seat belt moves to the vehicle side as well to avoid interference from the seat belt. The inventors have realized that, the guiding structure for the seat belt may increase cost as a separate part. Further, the guiding device is visible and thus affecting an appearance of the vehicle interior.

SUMMARY

According to one aspect of the disclosure, a seat for a vehicle is provided. The seat may comprise a lock device, the lock device being operable between an unlocked position and a locked position, at the unlocked position, the seat is enabled to pivot to a folded position, and at the lock position, the seat is enabled to be fixed at a use position; an unlock groove disposed on a seat back, wherein the unlock groove is in communication with the lock device, and the unlock groove is configured to receive a tongue of a seatbelt, wherein the lock device is triggered to the unlocked position when the tongue is inserted into the unlock groove.

In one embodiment, the lock device may comprise a striker disposed on a vehicle body to lock the seat, and a lock body movable between the unlocked position and the locked position. The lock body is separable from the striker at the unlocked position, and the lock body is engaged with the striker at the locked position.

In another embodiment, the lock device may comprise a latch, and the latch includes a fixed end connected to the lock body and a free end. When the lock body shifts to the unlocked position, the latch moves along to engage the tongue such that the tongue is retained in the unlock groove.

In another embodiment, the lock body may comprise a first and a second lock member biased against each other via a resilient member, the first and second lock members are pivotable relative to each other. Insertion of the tongue into the unlock groove forces the first lock member to pivot against the second member to release the striker such that the seat is pivotable from the use position to the folded position.

In another embodiment, the first lock member may comprise a latch. The latch may include a fixed end connected to the first lock member and a free end. When the tongue is inserted into the unlock groove to press the first lock member, the first lock member causes the latch to pivot along such that the free end of the latch engages the tongue to fix the tongue. When the seat is shifted from the folded position to the use position, the striker triggers the first lock member to pivot and lock the striker. The first lock member causes the latch to pivot such that the free end of the latch is disengaged from the tongue.

In another embodiment, the first lock member may include a main portion pivotable about a first axis and a slot disposed on the main portion, the slot is configured to lock or release the striker, wherein the second lock member is pivotable about a second axis.

In another embodiment, the first and the second lock members share the same pivot axis.

In another embodiment, the lock device may include a housing connected to the vehicle seat, the first and second locking members are pivotably supported on the housing.

In another embodiment, the first lock member may include a main portion and a lock end, where a slot is formed between the main portion and the lock end to let pass of the striker.

In another embodiment, a main portion of the first lock member includes a slot and an unlock stop. The slot and the unlock stop are positioned adjacent the second lock member and the second lock member includes a block. At the locked position of the lock device, the block engages the slot and at the unlocked position of the lock device, the block engages the unlock stop.

In another embodiment, the second lock member includes an unlock lever connected thereto. The unlock lever extends toward the unlock groove at the seat and is configured to contact the tongue when the tongue is inserted into the unlock groove.

According to another aspect of the present disclosure, a vehicle seat assembly is provided. The seat assembly may comprise a seat, a lock device, and a seatbelt for the seat. The seat is pivotably connected to a vehicle body via the lock device and the seatbelt is connected to the vehicle body and includes a tongue movably connected to the seatbelt. The seat includes an unlock groove to receive the tongue, and the lock device is configured to be triggered to an unlocked position upon insertion of the tongue such that the seat is pivotable about the vehicle body.

In one embodiment, the lock device may comprise a striker disposed on the vehicle body to lock the seat to the vehicle body, and a lock body operable between the unlocked position and a locked position. the lock body is separable from the striker at the unlocked position and the lock body is engaged with the striker at the locked position.

In another embodiment, the vehicle lock assembly may comprise a clamp portion adjacent to the unlock groove, and the tongue is retained in the unlock groove by the clamp portion at a folded position of the seat.

In another embodiment, the clamp portion is a hook adapted to extend into the unlock groove.

In another embodiment, the lock body may comprise: a first and a second lock member biased against each other via a resilient member. The first and second lock members are pivotable relative to each other. Insertion of the tongue into the unlock groove forces the first lock member to pivot against the second member to release the striker such that the seat is pivotable from the use position to the folded position.

In another embodiment, the first lock member may comprise a latch having a fixed end connected to the first lock member and a free end. When tongue is inserted into the unlock groove to press the first lock member, the first lock member causes the latch to pivot along such that the free end of the latch engages the tongue to fix the tongue. When the seat is shifted from the folded position to the use position, the striker triggers the first lock member to pivot and lock the striker. The first lock member causes the latch to pivot such that the free end of the latch is disengaged from the tongue.

According to another aspect of the disclosure, a vehicle seat is provided. The vehicle seat may comprise a lock device having a lock body, and an unlock groove disposed on a seat back to receive a tongue of a seat belt and in communication with the lock device. The lock body is pivotable about an axis to engage or disengage a striker fixed on the vehicle body. When the tongue is inserted into the unlock groove, the lock body pivots to disengage the striker such that the seat is pivotable to a folded position.

In one embodiment, the lock body comprises a main portion and a lock portion adapted to engage the striker.

In another embodiment, the main portion and the lock portion are pivotable relative to each other, and the main portion further includes a resilient member to assert a biasing force so as to urge the lock body to the lock position.

In another embodiment, the lock body may include a clamp portion, having a hook adapted to retain the tongue when the tongue is inserted into the unlock groove.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

One or more advantageous features as described herein elsewhere will be readily apparent from the following detailed description of embodiments when taken in connection with the accompanying drawings.

BRIEF DESCRIPTION OF THE DRAWINGS

For complete understanding of one or more embodiments of this invention, reference should be made to the embodiments illustrated in greater detail in the accompanying drawings and described below by way of examples.

FIG. 9 illustratively depicts an exploded view of the lock device in FIG. 7.

FIG. 10 illustratively depicts an exploded view of the lock device in FIG. 8.

Figure 1:
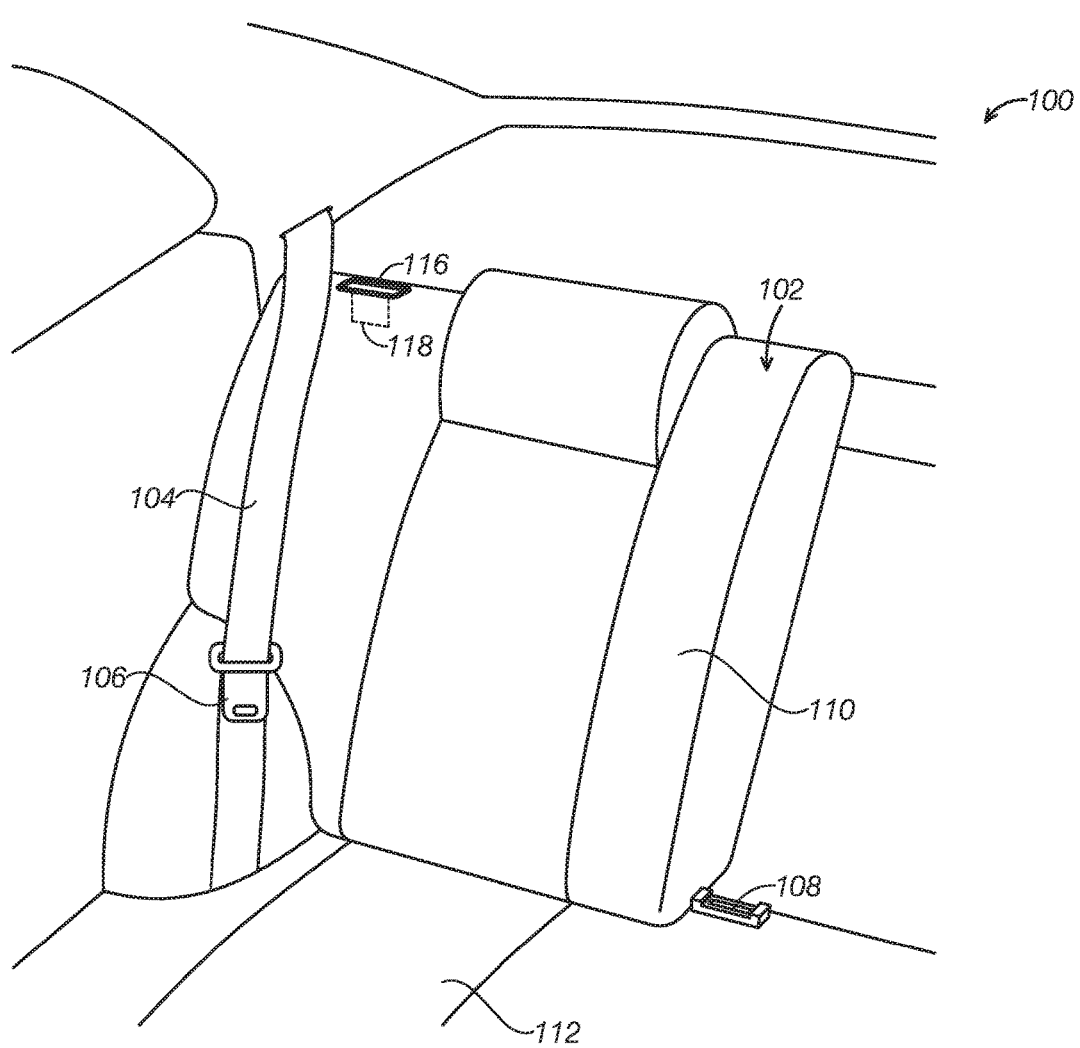
FIG. 1 illustratively depicts a vehicle seat according to one or more embodiments of the present disclosure.

It should be noted that these figures are intended to illustrate the general characteristics of methods, structures and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

As required, detailed embodiments of the present invention are disclosed herein; however, it should be understood that the disclosed embodiments are merely examples of the invention that may be implemented in various and alternative forms. The figures are not necessarily drawn in scale; some features may be exaggerated or minimized to show details of particular components. As referenced in the figures, the same or similar reference numerals are used to refer to the same or similar components. In the following description, various operating parameters and components are described for different constructed embodiments. These specific parameters and components are included as examples and are not meant to be limiting. Therefore, specific structural and functional details disclosed herein are not to be interpreted as limiting, but merely as a representative basis for teaching one skilled in the art to implement the present invention in various manners.

In order to provide a larger space for the goods or items for users, rear seats in modern motor vehicles are normally designed to be foldable toward the front so as to create an enlarged trunk space. However, as mentioned in the background, the seat belt might interfere with the seat while folding the seat, and get stuck in-between the seat and the vehicle body, and thus negatively impacting customer's use experience. Existing solutions include providing an extra fixing claw or the like to fix the seat belt. However, such solutions may increase complexity and associated cost. Further the extra component may occupy a space and impact the appearance of the seat. In some circumstances, even if an extra fixing device is provided, a user may neglect the fixing device and not use it and thus interferences still occur during folding of the seat. The inventors have realized the issues and have provided an integrated seat lock solution, which addresses at least one of the issues mentioned. One or more embodiments of the present disclosure provide a simplified design to fix the seat belt during seat folding.

FIG. 1 illustratively depicts a partial interior 100 of a vehicle according to one or more embodiments of the present disclosure. One rear seat 102 is shown. In one or more examples, the interior 100 includes a seat 102 and a seat belt 104 for the seat 102. A tongue 106 is provided on the seat belt 104 and moveable along the seat belt 104. A seat belt receiving slot 108 is provided at the seat 102. A seat belt retainer (now shown) is disposed under the receiving slot 108. A user may insert the tongue 106 of the seat belt 104 through the receiving slot 108 into the seat belt retainer and take the tongue 106 out from the receiving slot 108 as needed. In one or more examples, the seat 102 may include a cushion 112 and a seat back 110 foldable toward the cushion 112, which will be described further in combination of FIG. 2. Seat 102 may include another seat belt receiving slot 116. The seat belt receiving slot 116 may be provided at the seat back or other suitable locations. In one or more examples, an auxiliary seat belt retainer 118 is provided underneath the seat belt receiving slot 116. While folding the seat 102, a user may insert the tongue 106 of the seat belt 104 into the auxiliary seat belt retainer 118 through the seat belt receiving slot 116 or disengage the tongue 106 from the auxiliary seat belt retainer 118. The auxiliary seat belt retainer 118 may be any suitable seat belt retainer in the existing art.

In one or more examples, the seat belt receiving slot 116 may be adjacent to a lock device of the seat, and the tongue of the seat belt may be inserted into the lock device through the seat belt receiving slot 116 to facilitate folding of the seat and the tongue will be retained in the receiving slot 116. Detailed embodiments of the lock device will be described in combination with FIG. 2 through FIG. 10.

Figure 2:
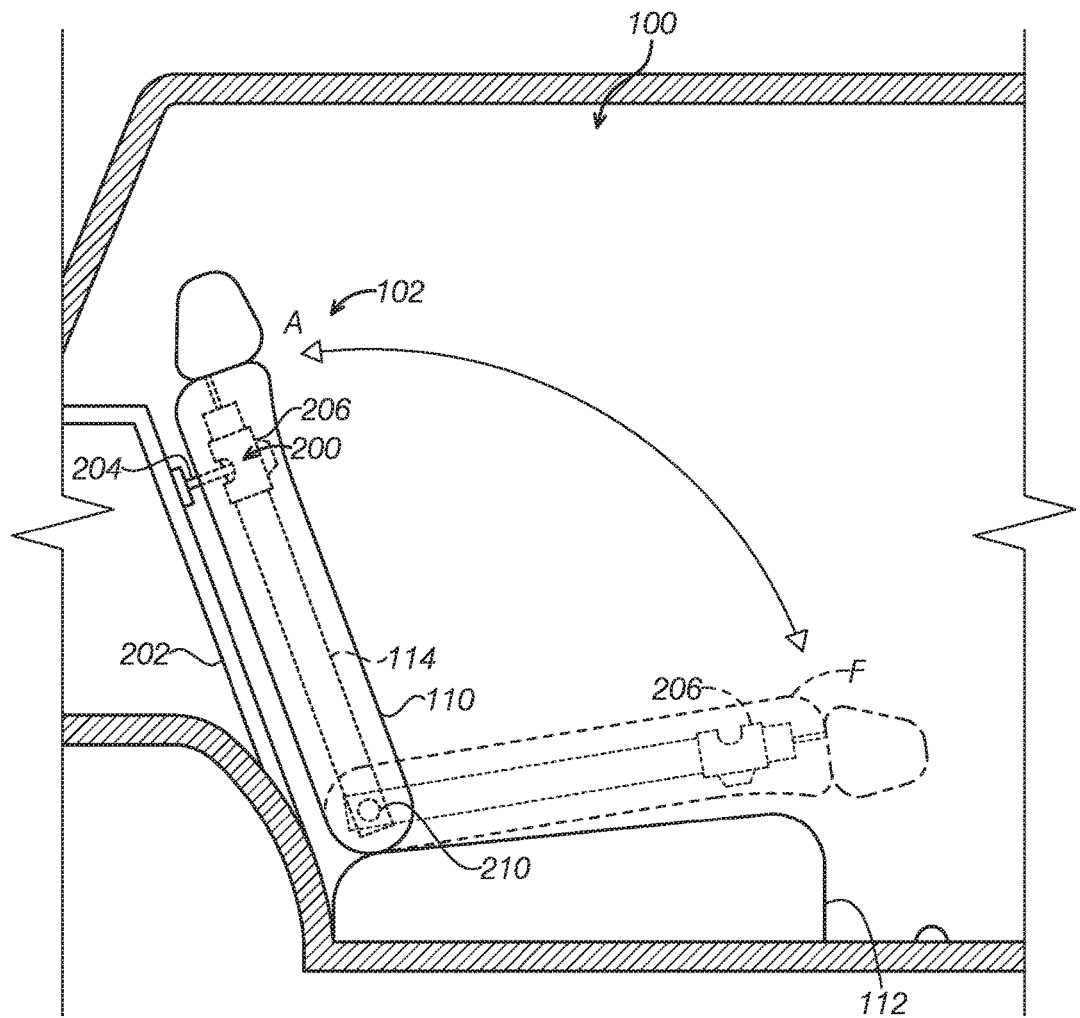
FIG. 2 illustratively depicts a side view of a vehicle seat according to one or more embodiments of the present disclosure.

FIG. 2 illustratively shows a side view of the vehicle seat 102 according to one or more embodiments of the present disclosure. In the depicted embodiment, the seat back 110 of the vehicle seat 102 may be pivotable relative to the cushion 112 between a use position A and a folded position F about the axis 210 (dashed line showing a position of the seat back 110 at a folded position). Specifically, in one or more non-limiting examples, the seat back 110 may be pivotably connected to the vehicle body 202 and locked or unlocked to the vehicle body by a lock device 200. In the depicted example, a striker 204 is connected to the vehicle body 202, and the seat back 110 further includes a lock body 206 connected to the frame 114. In one or more examples, the striker 204 may be a protruding ring type of wire, being bolted, welded or otherwise attached to the vehicle body 202.

Further referring to FIG. 2, in one or more examples, at the normal use position A of the seat 102, the lock device 200 is at a locked position. Specifically, the striker 204 on the vehicle body 202 is engaged with the lock body 206 on the seat back 110 such that the seat 102 is fixed at the use position A. When the seat 102 needs to be folded, the lock device 200 will need to be unlocked firstly to separate the striker 204 from the lock body 206, i.e., the lock device 200 needs to be in an unlocked position. Once the lock device 200 is unlocked, the seat back 110 of the seat 102 may be folded to the folded position F as shown in dashed lines to provide an enlarged room of the trunk.

Figure 3:
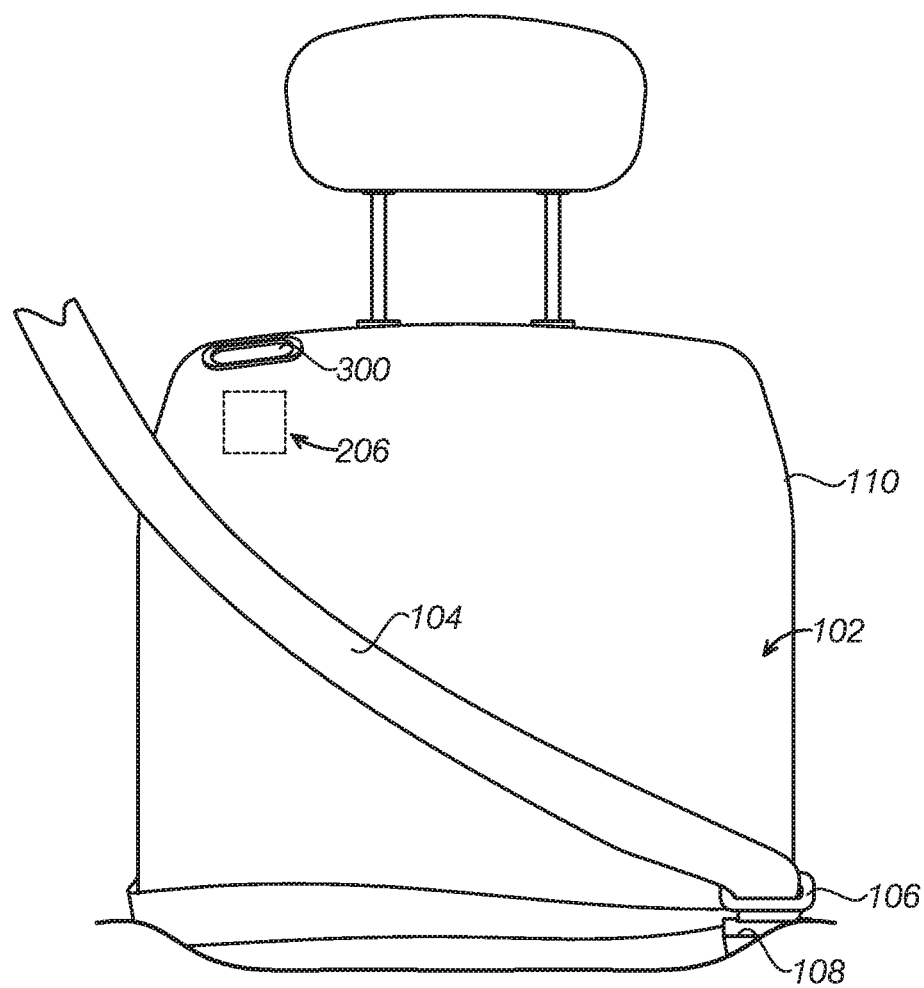
FIG. 3 illustratively depicts a vehicle seat in a use position according to one or more embodiments of the present disclosure, illustrating that a seat belt is in use.
Figure 4:
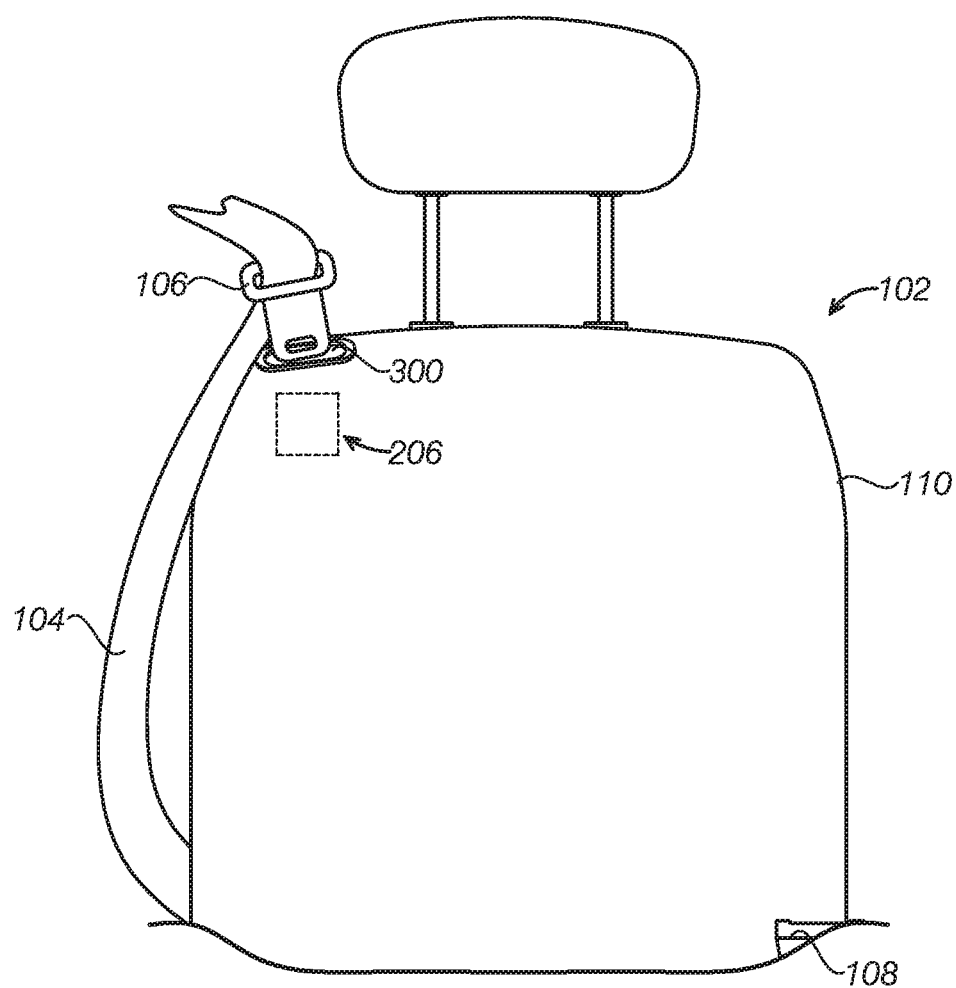
FIG. 4 illustratively depicts a vehicle seat in a use position according to one or more embodiments of the present disclosure, illustrating that a seat belt is stowed.
Figure 5:
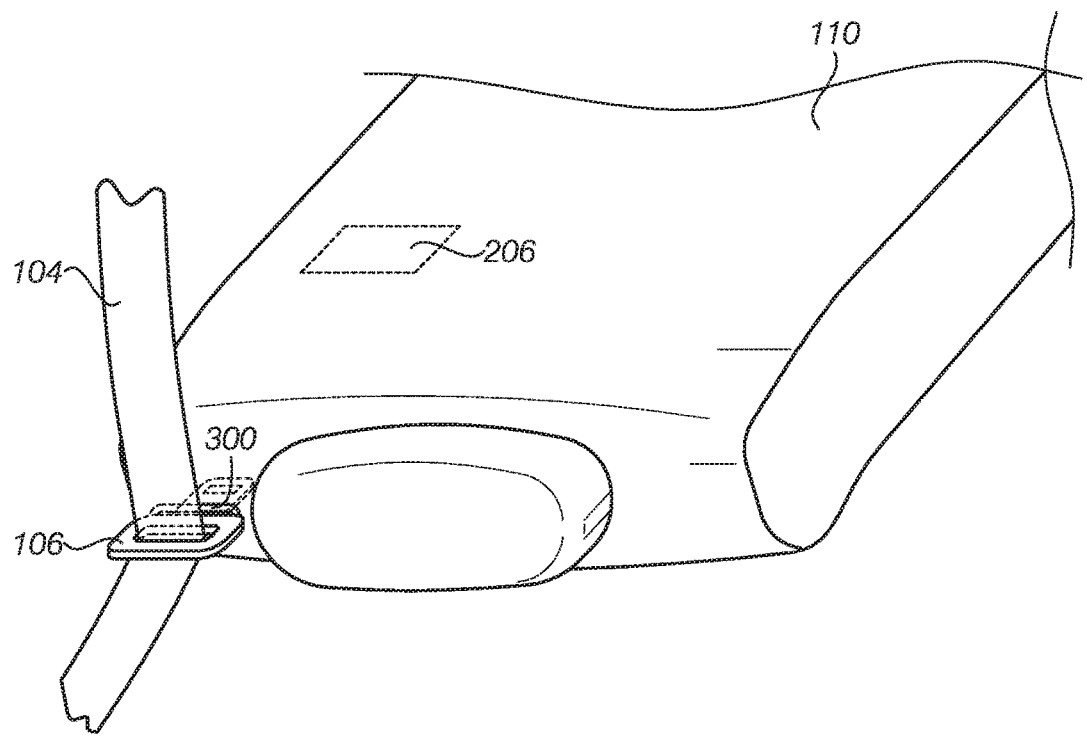
FIG. 5 illustratively depicts a vehicle seat in a folded position according to one or more embodiments of the present disclosure, illustrating that a seat belt is stowed.

Refer to FIG. 1 and FIG. 2, and with further reference of FIG. 3 through FIG. 5, the seat folding process will be explained in more detailed examples. FIG. 3 shows that the seat 102 is at a use position and the seat belt 104 is at a use position. FIG. 4 illustratively describes a seat at the use position, and the seat belt 104 is stowed. FIG. 5 illustratively describes a folded seat, and the seat and the seat belt 104 are at a stowed position.

As shown in FIG. 1 through FIG. 5, in one or more non-limiting examples, the vehicle seat 102 includes the seat belt receiving slot 108. FIG. 3 shows the seat 102 at a use position and a lock body 206 at a lock position. In other words, the lock body 206 is engaged with the striker 204 such that the vehicle seat back 110 is fixed to the vehicle body 202. The tongue 106 of the seat belt 104 may be received in the receiving slot 108 for a normal usage. Further, in some embodiments, the vehicle seat 102 includes an unlock groove 300 in communication with the lock body 206. The unlock groove 300 is positioned on the seat back 110 and adapted to receive the tongue 106 of the seat belt 104. The lock body 206 of the seat 102 is configured in a way that when the tongue 106 is inserted into the unlock groove 300, the lock body 206 is triggered to an unlock position, i.e., the lock body 206 is separated from the striker 204 so that the vehicle seat back 110 may be separated with the vehicle body 202. FIG. 4 illustrates a tongue 106 being inserted into an unlock groove 300 of the seat 102 to trigger an unlocking event. In one or more embodiments, the tongue 106 may act as a key to unlock the lock body 206 to facilitate separation of striker 204 from the lock body 206. Subsequently, the tongue 106 is retained in the unlock groove 300. As shown in FIG. 5, at the folded position F of the seat back 110, the tongue 106 is still retained in the unlock groove 300 such that the seat belt 104 is fixed to the seat back 110 of the seat 102 and will not cause an interference while the seat back 110 is folded. With such configuration, both functions of unlocking of the seat back 110 and fixing of the seat belt 104 are made possible with a simple structure and less components. As unlocking the seat back 110 is a necessary step for folding the seat and insertion of the tongue 106 by the user complete two steps (i.e., unlocking the seatback and fixing the seat belt), it is more convenient to the user when the seat belt is fixed while folding the seat back. In some embodiments, while the seat 102 is unfolded to a use position, the tongue 106 may be disengaged from the lock body 206 and leaves the unlock groove 300. When the tongue 106 is taken off the unlock groove, the lock body 206 is at the locked position, which means the lock body 206 and the striker 204 are engaged such that the seat back 110 is fixed relative to the vehicle body 202.

Figure 6:
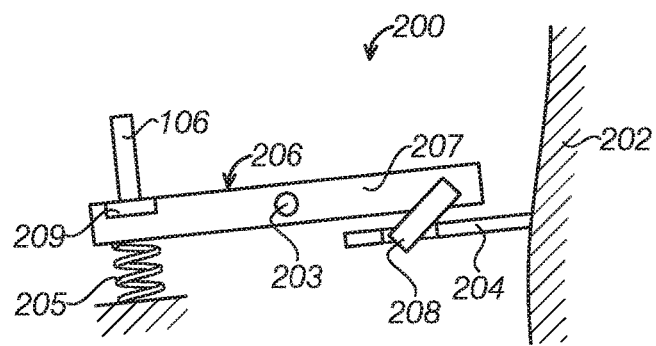
FIG. 6 illustratively depicts a lock device according to one embodiment of the present disclosure.

FIG. 6 illustratively depicted an example lock device 200 that may be applied in the present disclosure. The lock device 200 includes a lock body 206 located on a seat and the lock body 206 is pivotable about an axis 203 to be engaged with or disengaged from the striker 204. The lock body 206 may include a main body 207 and a lock portion 208. The lock portion 208 may engage or disengage the striker 204. In an example, the lock body 206 may be formed integrally. In one or more examples, the main body 207 and the lock portion 208 may be formed as two parts being pivotable relative to each other. The lock body 206 may include a resilient member 205 to assert a biasing force to facilitate the lock body 206 being moved from an open position to a lock position. In the embodiment depicted in FIG. 6, while the tongue 106 applies a force to the lock body 206 downwardly, the lock body 206 pivots counterclockwise to cause the lock portion 208 to disengage the striker 204. When the lock device 200 is unlocked, the seat can be folded. When the seat is pivoted from the folded position to the use position, the lock portion 208 may engage the striker 204 to lock the seat. In one or more examples, the lock body includes a clamp portion 209 to retain the tongue 106. The clamp portion 209 may be a hook which retains the tongue 106 when the tongue 106 is inserted through the unlock groove 300 or the slot 116. In one or more examples, the clamp portion 209 may be a separate structure disposed near the unlock groove 300 or the slot 116 in the seat. It should be appreciated that the lock device may be any appropriate lock devices, various striker lock designs in the art may be utilized in the lock device of the present disclosure.

Figure 7:
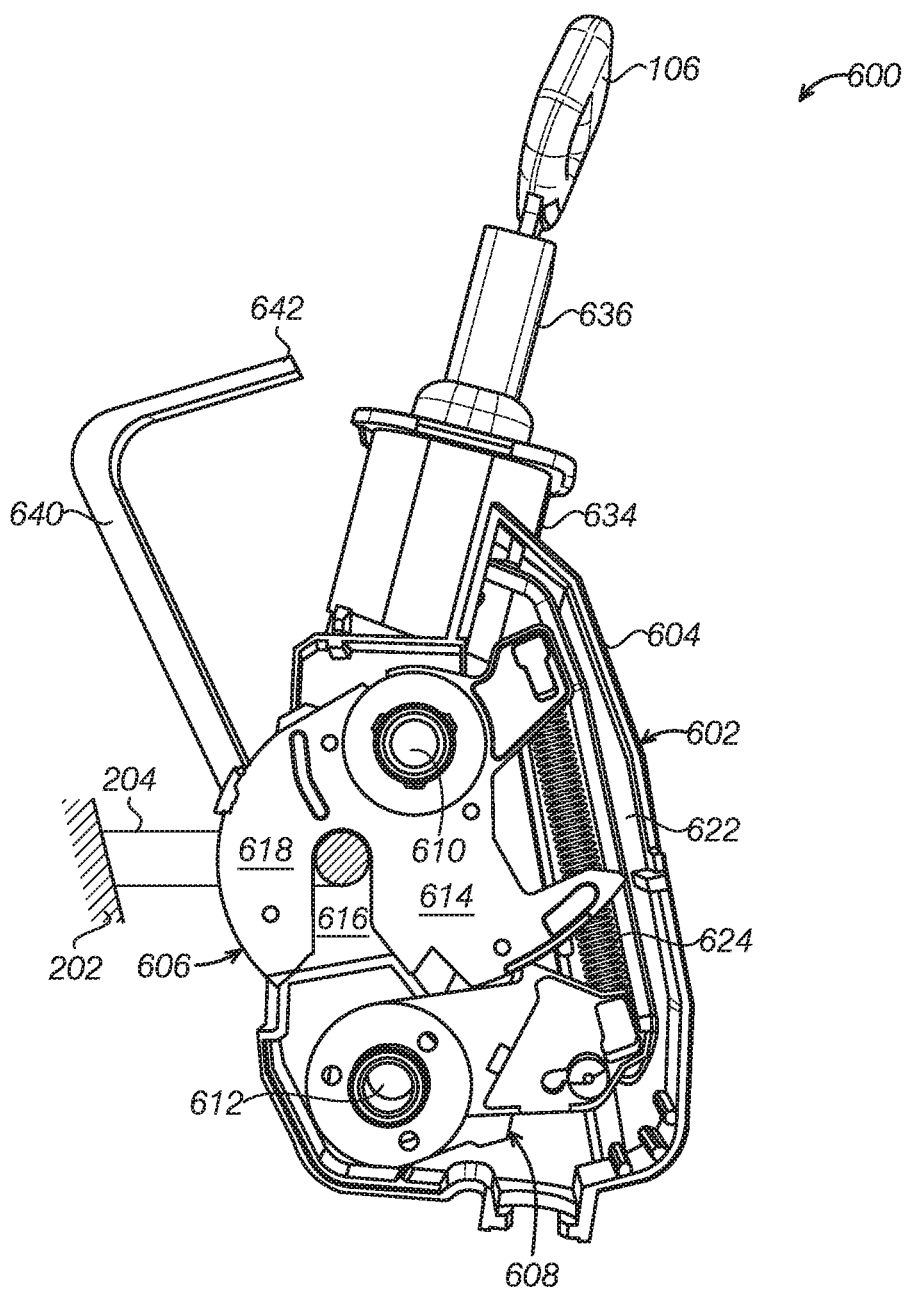
FIG. 7 illustratively depicts a lock device according to another embodiment of the present disclosure, illustrating that the lock device is at a locked position.
Figure 8:
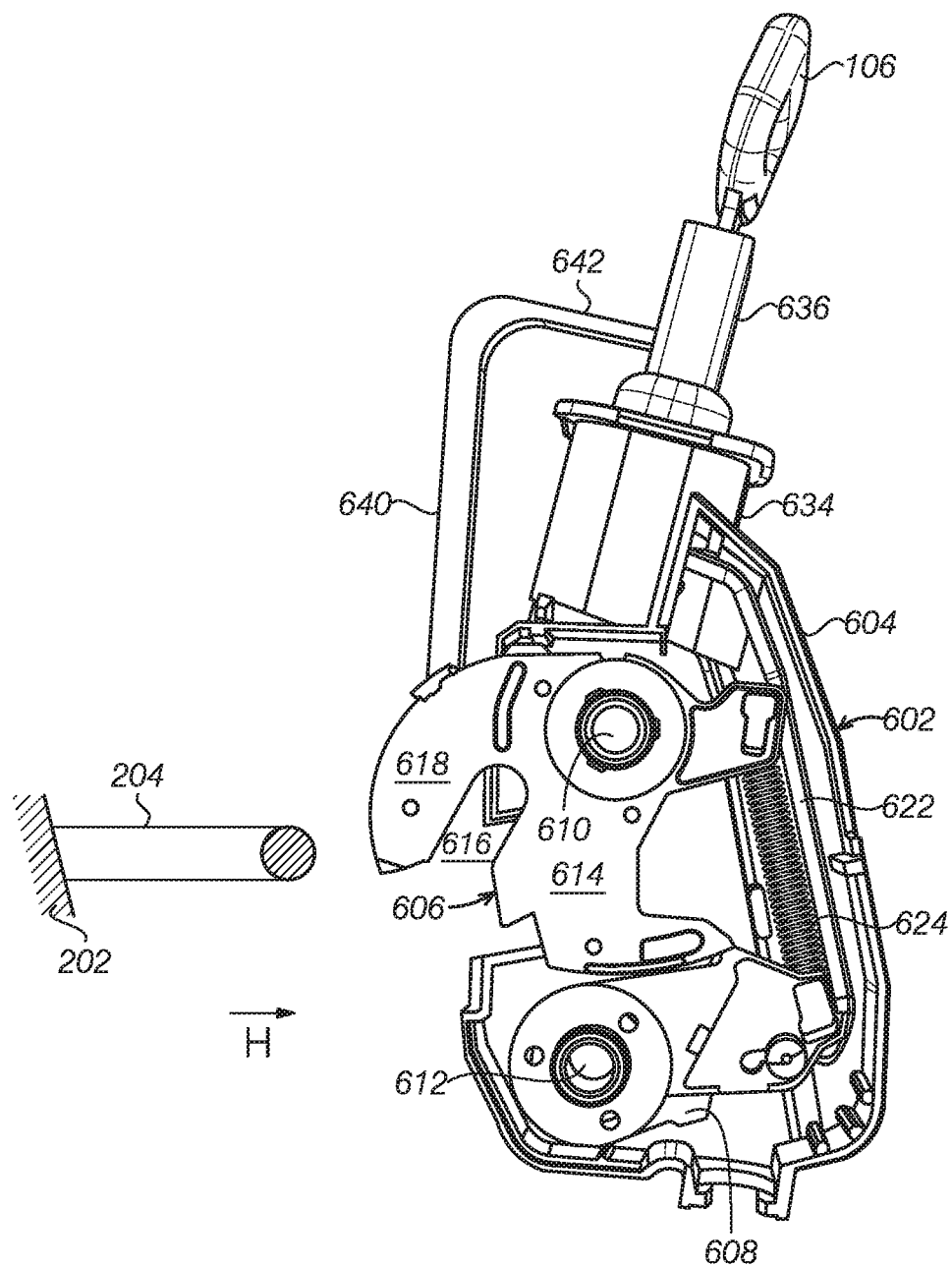
FIG. 8 illustratively depicts the lock device in FIG. 7, illustrating that the lock device is at an unlocked position.

FIG. 7 shows a lock device 600 to lock the seat 102 to the vehicle body 202, illustrating the lock device 600 at a lock position. FIG. 8 shows the lock device in FIG. 7, illustrating the lock device 600 at an unlock or an open position. FIG. 9 is an exploded view of the lock device in FIG. 7. Referring to FIGS. 7-9, in a non-limiting embodiment, the lock device 600 includes a striker 204 at the vehicle body 202 and a lock body 602 at the vehicle seat 102. In an example, the lock body 602 includes lock housings 604a, 604b which are connected to the frame 114 of the vehicle seat 102. The housings 604a and 604b mate each other to receive the locking components as a whole. Specifically, in an example, the housing 604a and/or 604b includes a first lock member 606 and a second lock member 608, and the first and second lock members 606 and 608 are pivotably supported on the housings. A resilient member such as a spring 624 is connected in between the first and second lock members 606 and 608 and the spring 624 asserts a biasing force therebetween. The first lock member 606 and the second lock member 608 includes a first pivot 610 and a second pivot 612, respectively. In the depicted example, the first lock member 606 includes a main portion 614 having a slot 616, and a lock end 618 adjacent to the vehicle body 202. The slot 616 may receive a striker 204. In the example shown in FIG. 7, the main portion 614 of the first lock member 606 contacts one side of the second lock member 608 and are jointly connected at a first position, while the striker 204 is retained in the slot 616 of the first lock member 606, whereby the seat back 110 is fixed to the vehicle body 202. In the example shown in FIG. 8, the first lock member 606 continues to contact one side of the lock member 608 and engages at a second position such that the striker 206 is separable from the lock body 602 (i.e. the slot 616), whereby the seat back 110 is allowed to be unlocked from the vehicle body 202 and then to be folded further.

FIG. 9 and FIG. 10 illustratively depict explosive views of the lock device 600 shown in FIG. 6 and FIG. 7. The structure of lock device 600 and how the lock is triggered or locked will be discussed further. In one example, the second lock member 608 includes a cover 620, the cover 620 of the second lock member 608 is connected to an unlock lever 622 to trigger an unlock event. The unlock lever 622 extends toward an unlock groove 300 at the seat 102, such that the tongue 106 is able to contact the unlock lever 622 when the tongue 106 is inserted into the unlock groove 300. In some embodiments, when the tongue 106 is inserted into the unlock groove 300 to press the unlock lever 622, the cover 620 causes the second lock member 608 to pivot about the axis 612, whereby the first lock member 606 and the second lock member 608 pivot toward each other. Urged by the spring 624, the first lock member 606 continues to pivot about the axis 610 hence the slot 616 of the first member 606 pivots about the axis 610, and therefore the striker 204 is allowed to be disengaged from the slot 616. It should be understood that the cover 622 of the second lock member 608 is not necessarily required and the unlock lever 622 may be directly connected to the second lock member 608, or the unlock lever 622 may be directly connected to the first lock member 606 as long as the unlock lever 622 may trigger the relative movement between the first lock member 606 and the second lock member 608. In some other examples, a separate unlock lever 622 is not required and the tongue 106 may be directly used to trigger the first lock member 606 or the second lock member 608.

Refer to FIG. 7 through FIG. 10, in some embodiments, the housings 604a and 604b of the lock device 600 may further include a first socket portion 634 in communication with the unlock groove 300 of the seat 102 and a second socket portion 636 connected to the first socket portion 634. A free end of the unlock lever 622 extends to the first socket portion 634 or in other alternative embodiments extends to the second socket portion 636. In some embodiments, the second socket portion 636 employs a shape adapted to receive the tongue 106, that is, the second socket portion 636 may have a rectangular sectioned passage, such that the tongue 106 may be inserted and retained in the second socket portion 636 during folding of the seat 102. In other embodiments, the first socket portion 634 and the second socket portion 636 may be an integrally formed passage, such that the tongue 106 may be inserted through to contact a portion of the lock body to trigger an unlock event of the lock body.

In some embodiments, again refer to FIG. 7 through FIG. 10, the lock device 600 may include a latch 640 having a fixed end 641 and a free end 642. The fixed end 641 may be provided on the first lock member 606 and extends toward the second socket portion 636. When the tongue 106 is inserted to trigger relative rotation between the first lock member 606 and the second lock member 608, the latch 640 pivots along and the free end 642 of the latch 640 inserts into an opening of the tongue 106 such that the tongue 106 of the seatbelt 104 is retained by the latch 640 and will not fall out easily. With such configuration, the seat belt 104 will not interfere with the seat 102 or get caught in a gap in between the seat 102 and the vehicle body 202 while folding the seat 102. In the above embodiment, a passage in communication with the lock body 602 and the unlock groove 300 may include an opening 633, and the opening 633 may be provided on the second socket portion 636 such that the latch 640 may be inserted through the opening 633 into an opening of defined on the tongue 106.

Again refer to FIG. 1 through FIG. 10, when the seat 102 is required to return to the use position A, the user can unfold the seat back 110 while the tongue 106 of the seat belt 104 is retained in the unlock groove 300. When the seat back 110 is close to the vehicle body 202, the lock body 602 is adjacent to the striker 204 on the vehicle body 202. Further, the striker 204 contacts the lock body 602. Specifically, the striker 204 hits the main body 614 of the first lock member 606 along the direction H shown in FIG. 8 such that the first lock member 606 is forced to pivot counterclockwise about the first axis 610, while the second lock member 608 being in contact with the first lock member 606 also pivots along and engages the main body 614 of the first lock member 606 at a locked position. As such, the striker 204 is retained in the slot 616. As the slot 616 pivots along the first lock member 606, the striker 204 is retained in the slot 616 and cannot be disengaged. In the embodiment where the first lock member 606 includes a latch 640, the free end 642 of the latch 640 pivots along the first lock member 606, thus the tongue 106 is separated with the latch 640 and the second socket portion 636 to resume a normal use state. In the example where the unlock lever 622 is connected with the second lock member 608, the unlock lever 622 also pivots along the second lock member 608 and returns to an untriggered state, until the next event triggered by inserting the tongue 106.

Figure 11A:
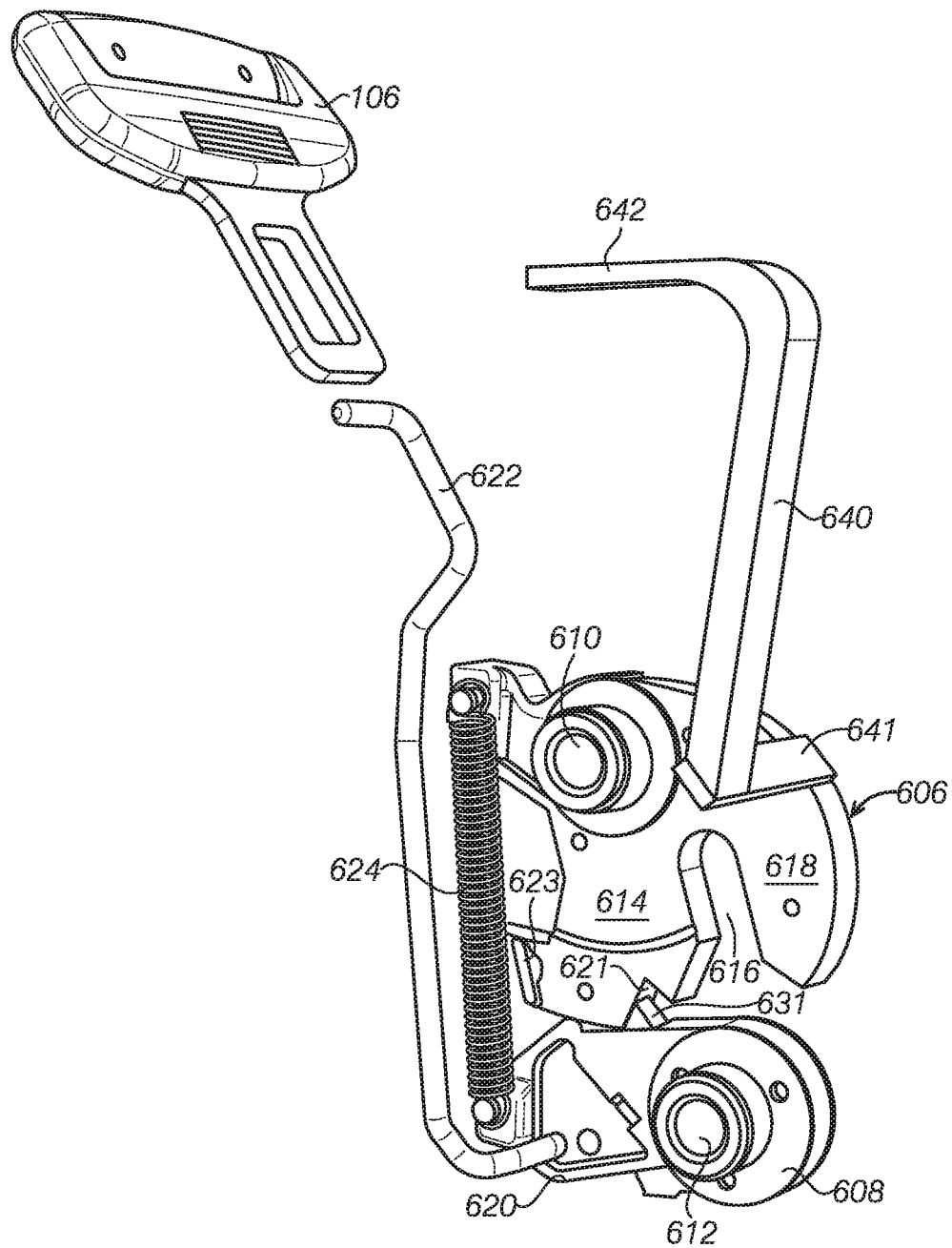
FIG. 11A and FIG. 11B illustratively depict the relative relation between a tongue and a lock device in FIG. 7 through FIG. 10, illustrating that the lock device is at a locked position and an unlocked position, respectively.
Figure 11B:
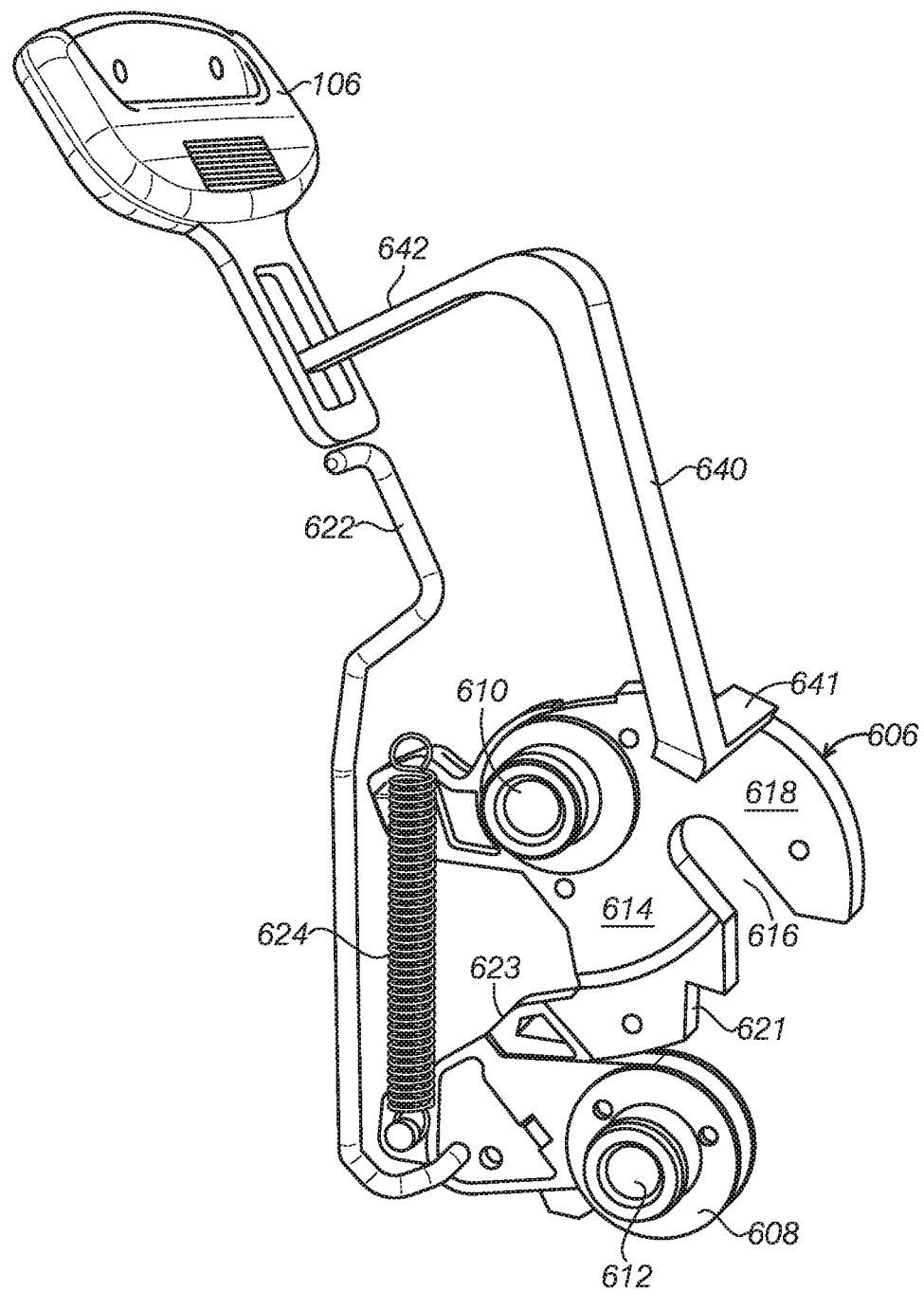

FIG. 11A and FIG. 11B illustratively depict a portion of the lock device 600 shown in FIG. 6 through FIG. 9. For the clear illustration, external parts such as the striker 204, socket and housings are not shown for better illustration of the relationship of the tongue 106 and lock device and a triggering process. In some embodiments, the main body 614 of the first lock member 606 includes a lock slot 621 and an unlock stop 623, while the second lock member 608 includes a protruding block 631. At the lock position shown in FIG. 11A, the slot 621 engages the protruding block 631 such that the first lock member 606 is fixed relative to the second lock member 608. In the position depicted in FIG. 11A, the seat 102 is at a normal use position. When the tongue 106 of the seat belt 104 is inserted, the tongue 106 triggers the unlock lever 622, by pressing the unlock lever 622. Then the unlock lever 622 causes the cover 620 of the second lock member 608 to pivot counterclockwise about the second axis 612, and the block 631 pivots counterclockwise accordingly and moves further relative to the slot 621 until being disengaged from the slot 621. Thereafter, the first lock member 606 pivots relative to the second lock member 608 urged by the spring 624 such that the block 631 engages the unlock stop 623. In the depicted embodiment, the unlock stop 623 is shown to be a hollow buckle to receive the block 631. Meanwhile, in the position shown as FIG. 11B, the first lock member 606 causes the latch 640 to pivot and to be retained in the opening of the tongue 106 such that the tongue 106 is retained in the unlock groove 300. At this position, the lock device 600 is unlocked and the seat back 110 of the seat 102 is allowed to be folded to the position shown in FIG. 5.

In the above example, the striker 204 is shown to be positioned on a vehicle body 202 corresponding to the seat back 110, while the lock body 206 and specifically an example lock body 602 is shown to be positioned inside the seat back 110 adjacent to the rear vehicle body 202. It should be appreciated that other layouts or arrangements are possible. For instance, the striker 204 may be provided at a side of the vehicle body instead of a rear portion and a side of the vehicle seat back may be provided with a lock body. Additionally, the unlock groove 300 in communication with the lock body 602 or 206 is shown to be positioned above the seat back 110, it should be appreciated that other appropriate positions are possible.

FIG. 6 through FIG. 11B illustratively describe an example lock device and it could be appreciated that the lock device 200 and 600 may be of any appropriate configuration. For example, in the depicted embodiment, the lock device 600 may include a spring loaded first lock member 606 and a second lock member 608 pivotable relative to each other. In other examples, the lock device may include one lock member moves between a locked and an unlocked position, or it may include lock members sharing with same axis.

As discussed in the present disclosure, one or more examples provided a seat lock device and an unlock mechanism. When a tongue is used as a key to open or unlock the seat lock device, less components as well as a simpler process are required to unlock the seat and fix the seat belt. Further as the tongue of the seat belt is inserted into the groove on the seat and retained therein, the seat belt can be fixed and will not interfere with the folding of seat back, and no additional fixing structure for the seat belt is required. Although the present disclosure is discussed under the context of the vehicle, it could be contemplated that the present disclosure could be applied into other appropriate fields, for instance seats in train, airplanes, and ships. Those who skilled in the art will readily recognize from such description, and the accompanying drawings that various changes, modifications and variations can be made therein without departing from the true spirit and fair scope of the invention as defined by the following claims.

The following claims particularly point out certain combinations and subcombinations regarded as novel and non-obvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A seat for a vehicle, comprising:
a seat belt;
a tongue provided on the seat belt and moveable along the seat belt;
a lock device having an unlocked position and a locked position and configured to retain the tongue, wherein at the unlocked position, the seat is enabled to pivot to a folded position, and at the locked position, the seat is fixed at a use position;
an unlock groove disposed on a seat back, wherein the unlock groove is in communication with the lock device, and the unlock groove is configured to receive the tongue of the seat belt, and wherein the lock device is triggered to the unlocked position and the tongue is retained in the unlock groove when the tongue is inserted into the unlock groove.

2. The seat of claim 1, wherein the lock device comprises a striker disposed on a vehicle body to lock the seat, and a lock body movable between the unlocked position and the locked position, and wherein the lock body is separated from the striker at the unlocked position, and is engaged with the striker at the locked position.

3. The seat of claim 2, wherein the lock device comprises a latch having a fixed end connected to the lock body and a free end, and when the lock body is shifted to the unlocked position, the latch moves with the lock body to engage the tongue such that the tongue is retained in the unlock groove.

4. The seat of claim 2, wherein the lock body comprises a first lock member and a second lock member biased against each other via a resilient member, the first and second lock members are pivotable relative to each other, wherein inserting the tongue into the unlock groove forces the first lock member to pivot against the second lock member to release the striker such that the seat is pivotable from the use position to the folded position.

5. The seat of claim 4, wherein the first lock member comprises a latch, the latch includes a fixed end connected to the first lock member and a free end, wherein, when the tongue is inserted into the unlock groove to press the first lock member, the first lock member causes the latch to pivot with the first lock member such that the free end of the latch engages and retains the tongue, when the seat is shifted from the folded position to the use position, the striker triggers the first lock member to pivot and lock the striker, and wherein the first lock member causes the latch to pivot such that the free end of the latch is disengaged from the tongue.

6. The seat of claim 5, wherein the first lock member includes a main portion pivotable about a first axis and a slot disposed on the main portion, wherein the slot is configured to lock or release the striker, and wherein the second lock member is pivotable about a second axis.

7. The seat of claim 5, wherein the lock device includes a housing connected to the seat, the first and second locking members are pivotably supported on the housing.

8. The seat of claim 5, wherein a main portion of the first lock member includes a slot and an unlock stop adjacent the second lock member, the second lock member includes a block, wherein at the locked position of the lock device, the block engages the slot; and at the unlocked position of the lock device, the block engages the unlock stop.

9. The seat of claim 8, wherein the second lock member includes an unlock lever connected thereto, the unlock lever extends toward the unlock groove at the seat and is configured to contact the tongue when the tongue is inserted into the unlock groove.

10. A vehicle seat assembly, comprising:
a seat;
a lock device, wherein the seat is pivotably connected to a vehicle body via the lock device;
a seat belt for the seat, wherein the seat belt is connected to the vehicle body; and
a tongue movably connected to the seat belt;
wherein the seat includes an unlock groove to receive the tongue, and the lock device is configured to be triggered to an unlocked position upon insertion of the tongue such that the seat is pivotable about the vehicle body and the tongue is retained in the lock device at the unlocked position such that the seat belt is fixed to the seat.

11. The vehicle seat assembly of claim 10, further comprising: a striker disposed on the vehicle body to lock the seat to the vehicle body, and a lock body operable between the unlocked position and a locked position, wherein the lock body is separated from the striker at the unlocked position and the lock body is engaged with the striker at the locked position.

12. The vehicle seat assembly of claim 11, wherein the lock body comprises a first lock member and a second lock member biased against each other via a resilient member, wherein the first and second lock members are pivotable relative to each other, wherein inserting the tongue into the unlock groove causes the first lock member to pivot against the second lock member to release the striker such that the seat is pivotable from a use position to a folded position.

13. The vehicle seat assembly of claim 12, wherein the first lock member comprises a latch, the latch includes a fixed end connected to the first lock member and a free end, wherein the first lock member causes the latch to pivot when the tongue is inserted into the unlock groove and presses the first lock member, such that the free end of the latch engages and retains the tongue,
wherein the striker triggers the first lock member to pivot and lock the striker when the seat is shifted from the folded position to the use position, and wherein the first lock member causes the latch to pivot such that the free end of the latch is disengaged from the tongue.

14. The vehicle seat assembly of claim 10, further comprising: a clamp portion adjacent to the unlock groove, wherein the tongue is retained in the unlock groove by the clamp portion at a folded position of the seat.

15. The vehicle seat assembly of claim 14, wherein the clamp portion is a hook adapted to extend into the unlock groove.

16. A vehicle seat, comprising:
a lock device including a striker and a lock body, wherein the strike is fixed on a vehicle body and the lock body is disposed in a seat back and pivotable about an axis to engage or disengage the striker fixed on the vehicle body;
an unlock groove disposed on the seat back to receive a tongue of a seat belt, wherein the unlock groove is in communication with the lock device;
wherein, when the tongue is inserted into the unlock groove, the lock body pivots to disengage the striker such that the vehicle seat is pivotable to a folded position, and
wherein the lock body includes a clamp portion, and wherein the clamp portion has a hook adapted to retain the tongue when the tongue is inserted into the unlock groove.

17. The vehicle seat of claim 16, wherein the lock body comprises a main body and a lock portion adapted to engage the striker.

18. The vehicle seat of claim 17, wherein the main body and the lock portion are pivotable relative to each other, and the lock body further includes a resilient member to assert a biasing force so as to move the lock body to a locked position.

* * * * *